Sept. 12, 1950 F. M. SHEA 2,522,467

RADIO CABINET TILT-OUT MECHANISM

Filed Feb. 19, 1949 3 Sheets-Sheet 1

INVENTOR.
FRANK MICHAEL SHEA.
BY
Alden D. Redfield,
Charles Marshall Hogan,
ATTYS.

Sept. 12, 1950 F. M. SHEA 2,522,467

RADIO CABINET TILT-OUT MECHANISM

Filed Feb. 19, 1949 3 Sheets-Sheet 2

INVENTOR.
FRANK MICHAEL SHEA.
BY
Alden D. Redfield,
Charles Marshall Hogan,
ATTYS.

Sept. 12, 1950 F. M. SHEA 2,522,467
RADIO CABINET TILT-OUT MECHANISM
Filed Feb. 19, 1949 3 Sheets-Sheet 3
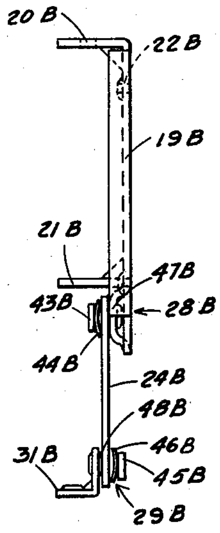
Fig. 6
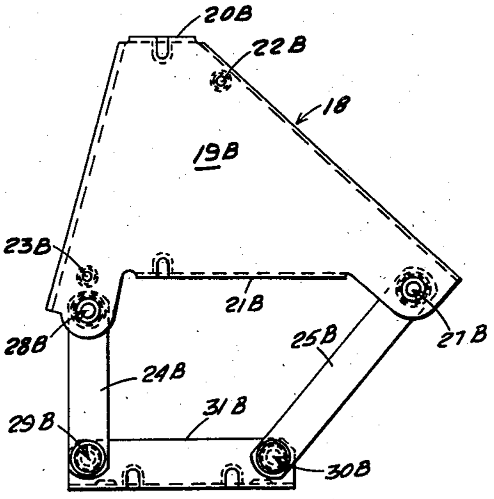
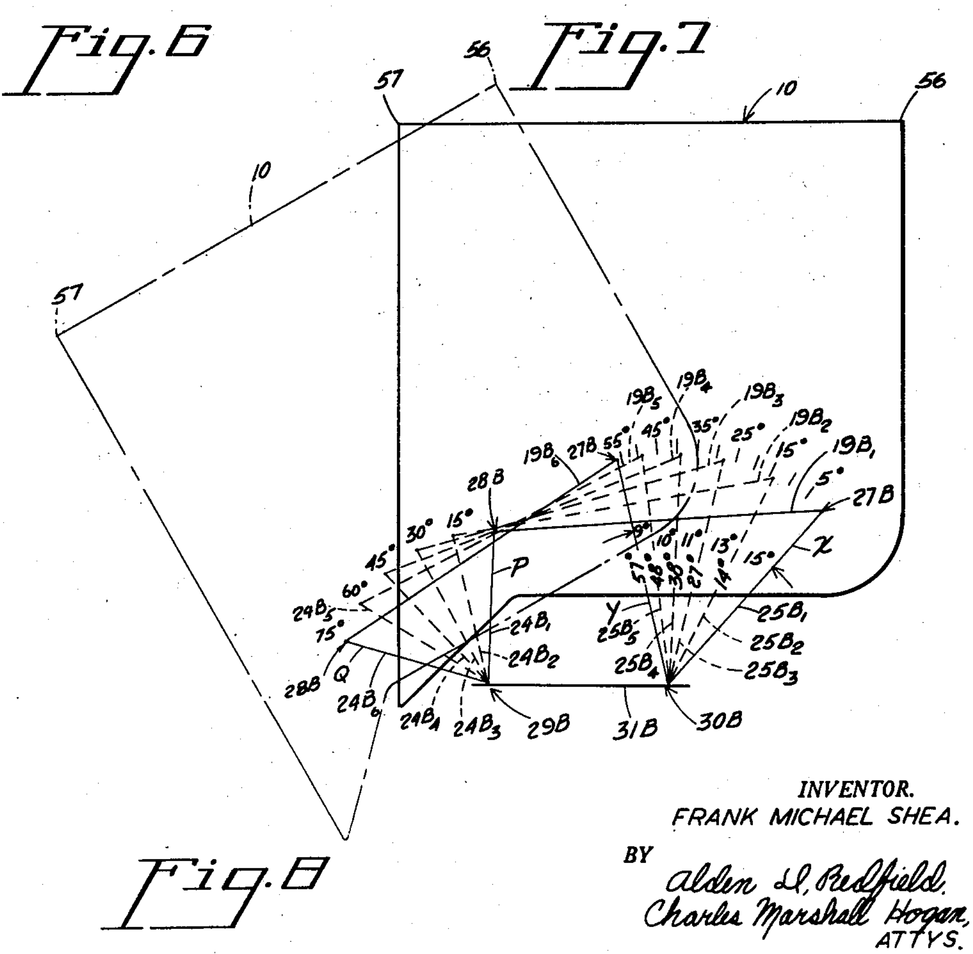
Fig. 7, Fig. 8
INVENTOR.
FRANK MICHAEL SHEA.
BY Alden D. Redfield.
Charles Marshall Hogan,
ATTYS.

Patented Sept. 12, 1950 2,522,467

UNITED STATES PATENT OFFICE 2,522,467

RADIO CABINET TILT-OUT MECHANISM

Frank Michael Shea, Cincinnati, Ohio, assignor to Avco Manufacturing Corporation, Cincinnati, Ohio, a corporation of Delaware Application February 19, 1949, Serial No. 77,368

2 Claims. (Cl. 312—7)

The present invention relates generally to radio and television receivers and more particularly to radio housing "tilt-out" mechanisms for use in such receivers.

The prior art embraces a number of radio receivers of the type including a cabinet formed with an opening at the front thereof and a radio housing unit, including front, top, and side panels, mounted in movable tilting relationship with respect to the cabinet, together with supporting means for swingably mounting the housing in such a way that the housing can be tilted into the cabinet for storage and tilted outwardly to render accessible for normal use the controls and dials on the top panel. Such prior art devices generally comprise complex linkages which are disposed outside of the housing and present an unsightly appearance. They also involve the mounting of the radio chassis on the housing rather than on the linkage, so that the chassis cannot readily be serviced without removal from the main cabinet.

It is a primary object of the invention to provide a more simple supporting mechanism for mounting the swingable housing and chassis in a receiver of the character set forth.

Another object of the invention is to provide a supporting mechanism which is concealed by the cabinet and the housing. A further object of the invention is to provide a mechanism which is not limited to curved connecting arms and links.

It is also a basic object of the invention to provide a supporting mechanism of the general character under consideration which directly supports both the housing and the chassis.

Still a further object contemplates an improved arrangement for mounting the chassis on the supporting mechanism.

An object of the invention is to provide a supporting mechanism which is so arranged that the chassis is counterbalanced so as to require a minimum of manual effort in tilting the housing.

Another object of the invention is to provide a housing-supporting mechanism which controls the housing tilt in such a way that the size of opening required in the cabinet for acceptance of the housing is reduced to a minimum.

In accordance with the invention the objects are achieved and the limitations of prior art devices are avoided by providing the combination of a pair of complementary supporting links, disposed within the side panels, means for individually securing the side panels to the links, means for securing the receiver chassis to the links, each of the links extending in a general front-to-back direction with respect to said housing, and a pair of complementary means for mounting the links in such a manner that the links and the housing are manually tiltable. Each of the link-mounting means comprises a front connecting arm pivotally secured at one end to the front of its associated link and a rear connecting arm pivotally secured at one end to the rear of its associated link. The other ends of the arms are pivotally mounted on the cabinet. These arms are always divergent, and the rear arm is of greater length than the front arm. The rear arm extends diagonally rearwardly and upwardly when the housing is in storage position while the front arm extends substantially vertically, whereby the rear end of the associated link is displaced vertically by a relatively small amount as the housing is tilted forwardly, thereby to minimize the required size of the opening in the main cabinet, while the front end of the link is displaced vertically by a relatively large amount.

According to other features of the present invention, the front connecting arms cooperate with rubber stops to limit the forward tilting movement of the housing, and the main links are provided with integral means on which the chassis is so mounted as to reduce microphonics or damage from handling.

For a better understanding of the present invention, together with other and further objects, advantages and capabilities thereof, reference is made to the following detailed description of the accompanying drawings, in which there is illustrated a radio cabinet having a tilt-out housing and including a preferred form of supporting mechanism in accordance with the present invention.

In the drawings:

Figs. 6 and 7 are front and end views of the right-hand main supporting link and its associated connecting arms; and Fig. 8 is a schematic diagram employed as an aid in illustrating the operation of the invention.

Figure 1:
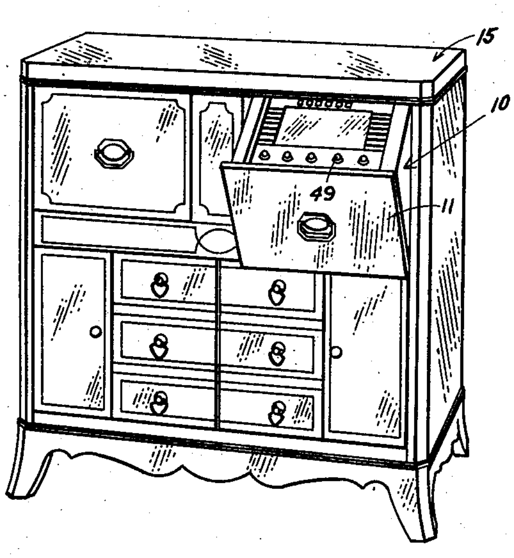
Fig. 1 is a perspective view of a radio receiver cabinet including a "tilt-out" housing and a supporting mechanism in accordance with the present invention.
Figure 2:
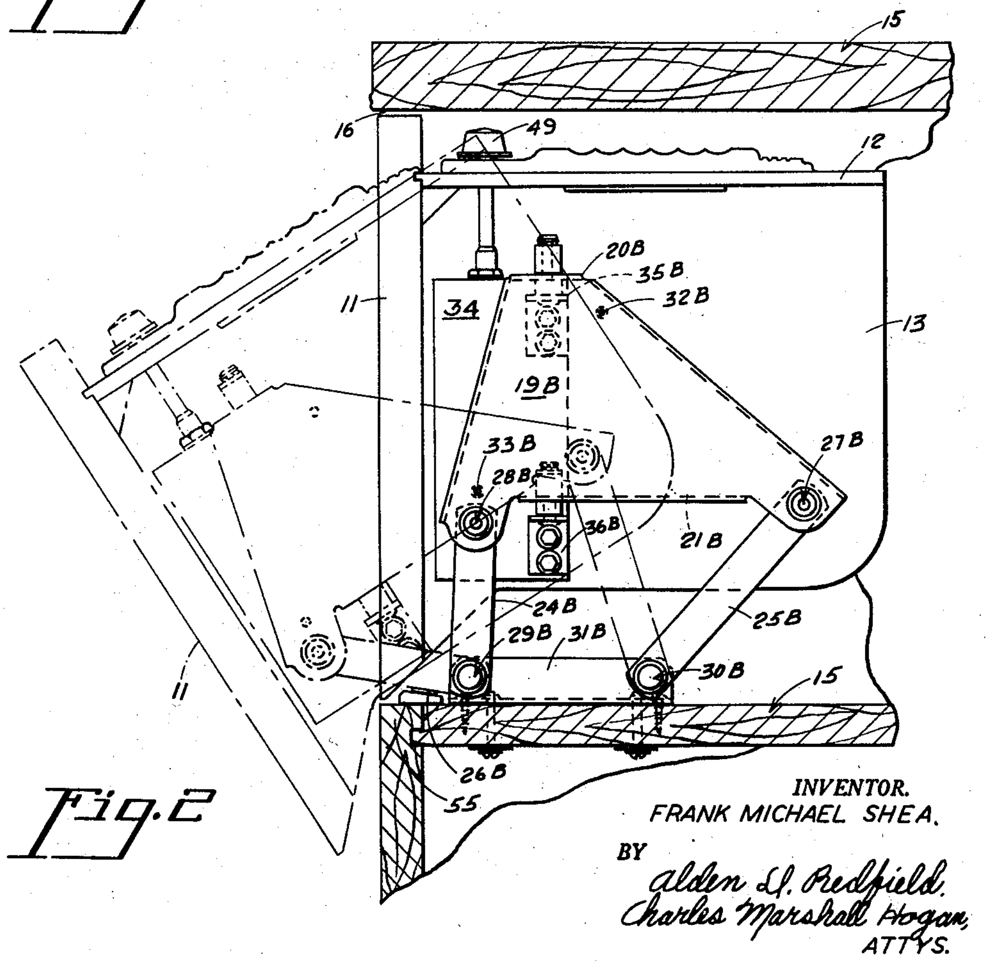
Fig. 2 is an elevational sectional view of the housing and supporting mechanism contained in the Fig. 1 embodiment, the full lines showing the positions of the parts when the housing is in storage position, and the dashed lines showing the corresponding positions when the housing is in normal operation.
Figure 3:
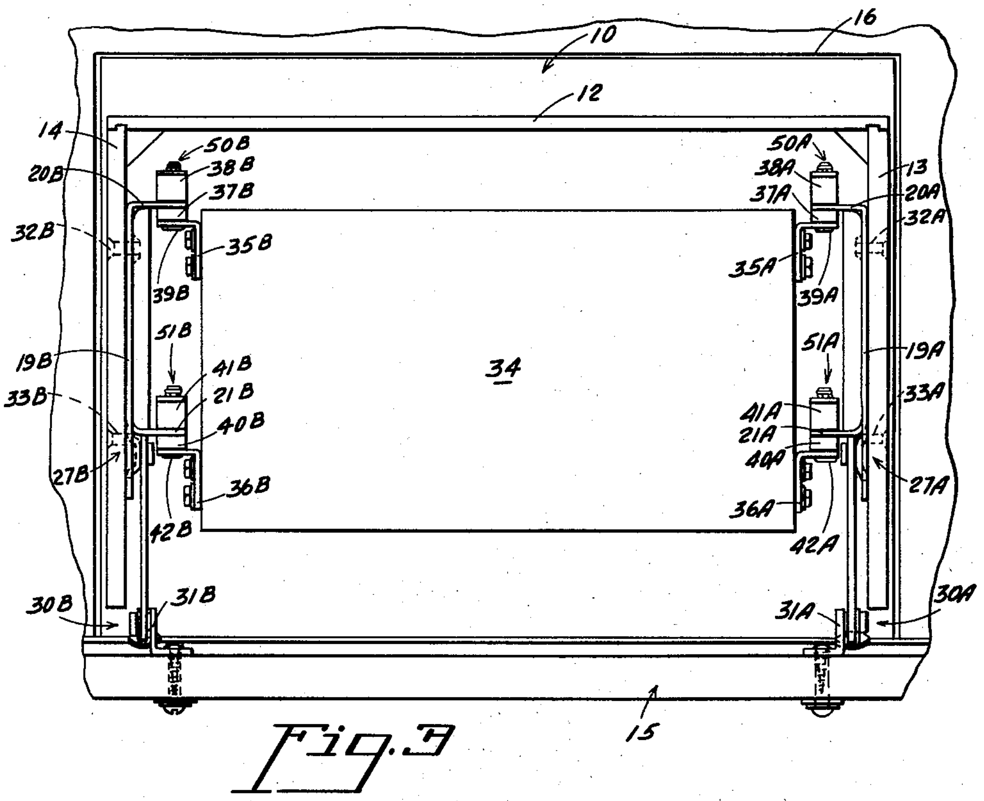
Fig. 3 is a back view of the Fig. 2 housing showing the supporting mechanism and the chassis mountings.

Referring now specifically to Figs. 1, 2, and 3 of the drawings, there is shown a tilt-out housing unit 10 comprising a front panel 11, a top panel 12, a left side panel 13, and a right side panel 14 (as seen from the front). This housing is swingably supported for acceptance in or partial withdrawal from an opening 16 provided in the cabinet 15. The support for both the housing 10 and the chassis 34 is provided by a pair of complementary supporting plates 19A and 19B, together with the associated elements illustrated in Figs. 4, 5, 6, and 7, the left-hand plate assembly being designated by the reference numeral 17 and the right-hand plate assembly being designated by the reference numeral 18.

Figure 4:
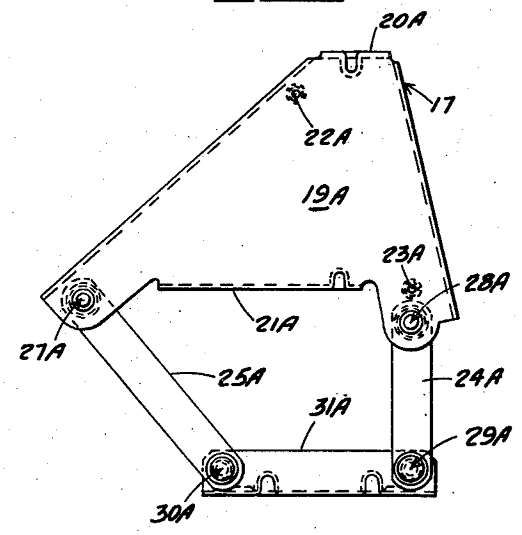
Figs. 4 and 5 are end and front views of the left-hand main supporting link and its associated connecting arms.
Figure 5:
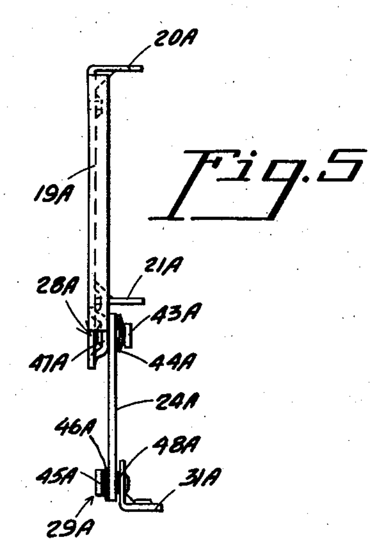

Referring now specifically to Figs. 4, 5, 6, and 7, it will be understood that the left-hand link or plate assembly shown in Figs. 4 and 5 is complementary to the right-hand assembly shown in Figs. 6 and 7, the suffix "A" being applied to reference numerals applicable to the left-hand assembly, and the suffix "B" being applied to the right-hand elements. This being understood, only the left-hand assembly need be described in detail.

The supporting link or plate 19A may be roughly of triangular form, and it has an integral inwardly-turned top flange 20A and an integral inwardly-turned bottom flange 21A, to which the chassis 34 is secured. The left side panel 13 is secured to the link 19A by screws 32A and 33A cooperating with threaded openings 22A and 23A, respectively, located in link 19A. The construction is such that the link is inside of the housing and is completely concealed thereby.

The link 19A extends in a general front-to-back direction with respect to the housing, and the link or plate is provided with means for mounting it in such a manner that the link and the housing are manually tiltable. This means comprises a front connecting arm 24A and a rear connecting arm 25A, each having their upper ends pivotally secured to the link. For example, connecting arm 24A is pivotally secured to the front of link 19A at 28A; connecting arm 25A is pivotally secured to the rear of link 19A at 27A. The other ends of the arms are pivotally secured at 29A and 30A, respectively, to a fixed support 31A rigidly mounted on the main cabinet and extending in a general front-to-back direction. The spacing between pivots 29A and 30A is fixed by support 31A. The spacing between pivots 27A and 28A is fixed by main link 19A.

It will be seen that as the housing is tilted from the storage position to the position for normal operation, respectively indicated by the full lines and the dashed lines in Fig. 2, the angle between the full-line front panel 11 and the dashed-line front panel outline is on the order of 30° or so. However, the front connecting arm 24A traverses an arc on the order of 85° relative to its fixed pivot 29A, and the rear connecting arm 25A traverses an angle of approximately 55° with respect to its fixed pivot 30A, both pivots 29A and 30A being displaced from the housing 10.

The connecting arms 24A and 25A are divergent in that, when the housing is in storage position, the front connecting arm 24A approximates a vertical position while the rear connecting arm 25A extends rearwardly and upwardly and is at a diagonal position of approximately 45° with respect to the vertical. Additionally, the rear connecting arm 25A has a greater length than the front connecting arm. In one successful commercial embodiment of the invention the following illustrative parameters were found suitable:

| | Inches |
|---|---|
| Distance between central axes of pivots 27A and 28A | 6.125 |
| Distance between central axes of pivots 27A and 30A | 4.312 |
| Distance between central axes of pivots 29A and 30A | 3.375 |
| Distance between central axes of pivots 29A and 28A | 2.875 |

These pivots, connecting arms, and links are so arranged that the rear end of each link traverses progressively smaller increments of arc relative to its pivot (30A, for example) as the housing is tilted forwardly, while the front end of each link traverses equal increments of arc relative to its pivot. The vertical displacement of pivot 27A is small while the vertical displacement of pivot 28A is large, thereby to minimize the required size of the opening 16 and to effect other advantages present to be described.

According to one feature of the invention, each front arm, such as 24B (Fig. 2), cooperates with a corresponding rubber bumper, such as 26B, mounted on the cabinet, to limit the forward-tilting motion of the housing 10.

There remains to be described the means for securing the chassis to the links. The left-hand securing arrangement is complementary to the right-hand securing arrangement, so that only the left-hand securing means need be described in detail. Referring to Fig. 3 for that purpose, it will be seen that the chassis 34 is provided with two spaced mounting angles 35A and 36A, respectively, adapted to be placed below the mounting flanges 20A and 21A, respectively, of link 19A. The mounting angles are spaced from the mounting flanges by rubber washers 37A and 40A, respectively. Over the mounting flanges 20A and 21A are placed rubber washers 38A and 41A, respectively. Each sub-assembly of washer, mounting flange, and mounting angle is apertured to receive a pin such as 39A which is secured in place by an appropriate metallic washer and hairpin expedient such as that shown at 50A, for example. Similarly, the sub-assembly of mounting flange 21A, mounting angle 36A, washer 40A, and washer 41A is secured together by a pin 42A and a metallic washer and hairpin arrangement 51A.

It will be seen that the above-described arrangement for mounting the chassis on the main links 19A and 19B tends to minimize damage to the receiver circuit elements during transportation and handling, and it also enhances performance in that microphonics are prevented. Production installation of the chassis is very simple and rapid in that the chassis pins are simply slipped through the rubber mountings, whereupon the metallic washers and hairpins are applied to the pins. The chassis can be serviced without removing it from the cabinet. The operating dials, such as 49, are removed in conventional manner, and the four screws 32A, 33A, 32B, and 33B are simply loosened to permit removal of the housing from the links 19A, 19B. The chassis is hung and counterbalanced in such a manner that a minimum of effort is required to open and close the bin, the center of gravity of the chassis being placed between the pivotal points 28A and 27A.

Reference is again made specifically to Figs. 4 and 5, which illustrate the details of the construction of pivots 28A and 29A. The pivotal arrangement 28A comprises a stud 43A, a bowed washer 44A, and a lubriplate 47A. Arm 24A is located inwardly (i. e., toward chassis) of link 19A. The pivot 29A comprises a stud 45A, a bowed washer 46A, and a lubriplate 48A. The arm 24A is located outside of the support 31A.

Referring now to Figs. 2, 3, 6, and 7, it will be understood that the construction of the right-hand linkage and mounting assembly is generally similar to that of the left-hand assembly, the corresponding mounting flanges and supports and flanged portions of the mounting angles extending in opposite directions. The right-hand assembly comprises a main link 19B formed with a top mounting flange 20B and a bottom mounting flange 21B, a top screw tap 22B, a bottom screw tap 23B, a front connecting arm 24B, a rear connecting arm 25B, a fixed support 31B for the connecting arms, pivots 27B, 28B, 29B, and 30B, housing-mounting screws 32B and 33B, chassis mounting angles 35B and 36B, rubber chassis-mounting washers 37B, 38B, 40B, and 41B, chassis-mounting pins 39B and 42B, studs 43B and 45B, bowed washers 44B and 46B, lubriplates 47B and 48B, and metallic washers and hairpin expedients 50B and 51B, and bumper 26B. The side panels are preferably formed with diagonally extending depending portions, such as that indicated at 53 (Fig. 2), and the front panel is diagonally cut as indicated at 54 in order to provide clearance from corner 55 of the cabinet opening and in order to assure concealment of the front connecting arms from the operator.

The rotation of connecting arm 24B through an angle which is large with respect to the rotation of connecting arm 25B, for example, as the housing is tilted outwardly, means that the pivot point 28B of link 19B traverses a greater length of arc relative to pivot 29B than does the pivot point 27B of the link 19B with respect to its pivotal point 30B. It will be observed from an inspection of Fig. 8 that the rotation of arm 25B from the storage position X to the operating position Y approximates 55°, while the rotation of arm 24B approximates 75° between its corresponding positions P and Q. Further, if a constant rate of rotation of arm 24B be assumed, relative to pivot 29B, the rotation of arm 25B relative to its pivot 30B constantly decreases as the housing is tilted outwardly from the cabinet. The rotation of pivotal point 27B and corner 56 of housing 10, as the housing is tilted toward the cabinet, is along a larger radius than the corresponding motion of pivotal point 28B and corner 57 of cabinet 10. The greater the radius of motion, the more nearly it approximates translation. By providing an arrangement in which the motion of the rear of each mounting link is along a radius which is large with respect to the radius of motion of the front portion 28B of the link, the above-described mechanism permits a relatively small opening 16 to be employed for acceptance of the housing 10. It should further be noted that the rotation of pivotal point 27B between points X and Y is such as to generate substantially a large translatory component relative to the horizontal plane and a small translatory component relative to the vertical plane. On the other hand, the motion of pivotal point 28B between points P and Q is such as to generate a large component of motion in the vertical plane. The latter motion, however, is communicated to corner 57, a part of the housing which has substantially no significance in requiring that the opening 16 provide additional clearance when the housing panel 11 has cleared the opening.

In Fig. 8 the connecting arms are indicated by lines to which the corresponding reference numerals are applied. The same is true of the main link 19B and the support 31B. It will be understood that the behavior of the left-hand assembly is similar to that symbolically and mathematically shown in Fig. 8.

The numerals $25B_1$, $25B_2$, $25B_3$, etc., employed in Fig. 8 are intended to designate successive positions of arm 25B. The same system of designation is employed with respect to connecting arm 24B and link 19B.

While there has been shown and described what is at present considered to be the preferred embodiment of the present invention, it will be understood by those skilled in the art that various substitutions of equivalents may be made therein without departing from the true scope of the invention as defined by the following claims.

Having thus fully disclosed and described my invention, I claim:

1. In a radio receiver of the type which includes a cabinet formed with an opening in the front thereof and a box-like radio housing unit mounted in movable tilting relation with respect to said cabinet, the combination of a receiver chassis, individual supporting plates located on each side of and exteriorly of said chassis but interiorly of said housing unit, each of said plates being of a generally triangular formation and formed with a flat outer surface in abutment with said housing and with inwardly directed apertured flanges at base and apex, means for securing said housing to said plates, said chassis being disposed with its length dimension between and perpendicular to said plates and its width dimension normal to the bases of said plates, means for mounting said chassis on said plates, the mounting means comprising four angle members secured to said chassis and each formed with an outwardly directed apertured flange underlying one of said inwardly directed flanges, said mounting means also comprising individual washers of soft material disposed between each inwardly directed flange and an outwardly directed flange and individual removable fasteners for securing each outwardly directed flange to and in registry with an inwardly directed flange, and a complementary pair of means for mounting the assembly of plates and chassis and housing unit in movable tilting relation with respect to said cabinet, each of said means comprising a straight front connecting arm pivotally secured at one end to one extremity of the base of the associated plate and a longer straight gear connecting arm pivotally secured at one end to the other extremity of the base of said plate, spaced pivots for securing the other ends of said arms to said cabinet, said front arm extending generally upwardly in the general direction of the center of gravity of said chassis and said rear arm extending diagonally upwardly and rearwardly when the housing is in storage position, whereby the vertical linear displacement of the rear top corner of the housing is less than the vertical linear displacement of the front bottom corner of the housing when the housing is tilted forwardly.

2. In a radio receiver of the type which includes a cabinet formed with an opening in the front thereof and a box-like radio housing unit mounted in movable tilting relation with respect to said cabinet, the combination of a receiver chassis, individual supporting plates located on each side of and exteriorly of said chassis but interiorly of said housing unit, each of said plates being of a generally triangular formation and formed with a flat outer surface in abutment with said housing and with inwardly directed apertured flanges at base and apex, means for securing said housing to said plates, said chassis being disposed with its length dimension between and perpendicular to said plates and its width dimension normal to the bases of said plates, means for mounting said chassis on said plates, the mounting means comprising four angle members secured to said chassis and each formed with an outwardly directed apertured flange underlying one of said inwardly directed flanges, said mounting means also comprising individual washers of soft material disposed between each inwardly directed flange and an outwardly directed flange and individual removable fasteners for securing each outwardly directed flange to and in registry with an inwardly directed flange, and means for mounting the assembly of plates and chassis and housing unit in movable tilting relation with respect to said cabinet.

FRANK MICHAEL SHEA.

REFERENCES CITED

The following references are of record in the file of this patent:

UNITED STATES PATENTS

| Number | Name | Date |
|---|---|---|
| 1,682,695 | Miner | Aug. 28, 1928 |
| 2,447,572 | Emde | Aug. 24, 1948 |

Certificate of Correction

Patent No. 2,522,467 September 12, 1950

FRANK MICHAEL SHEA

It is hereby certified that error appears in the printed specification of the above numbered patent requiring correction as follows:

Column 6, line 63, for the word "gear" read *rear*;

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*